April 24, 1928.
F. NEUBAUER
1,667,562
MICROMETER
Filed Dec. 21, 1926      2 Sheets-Sheet 2
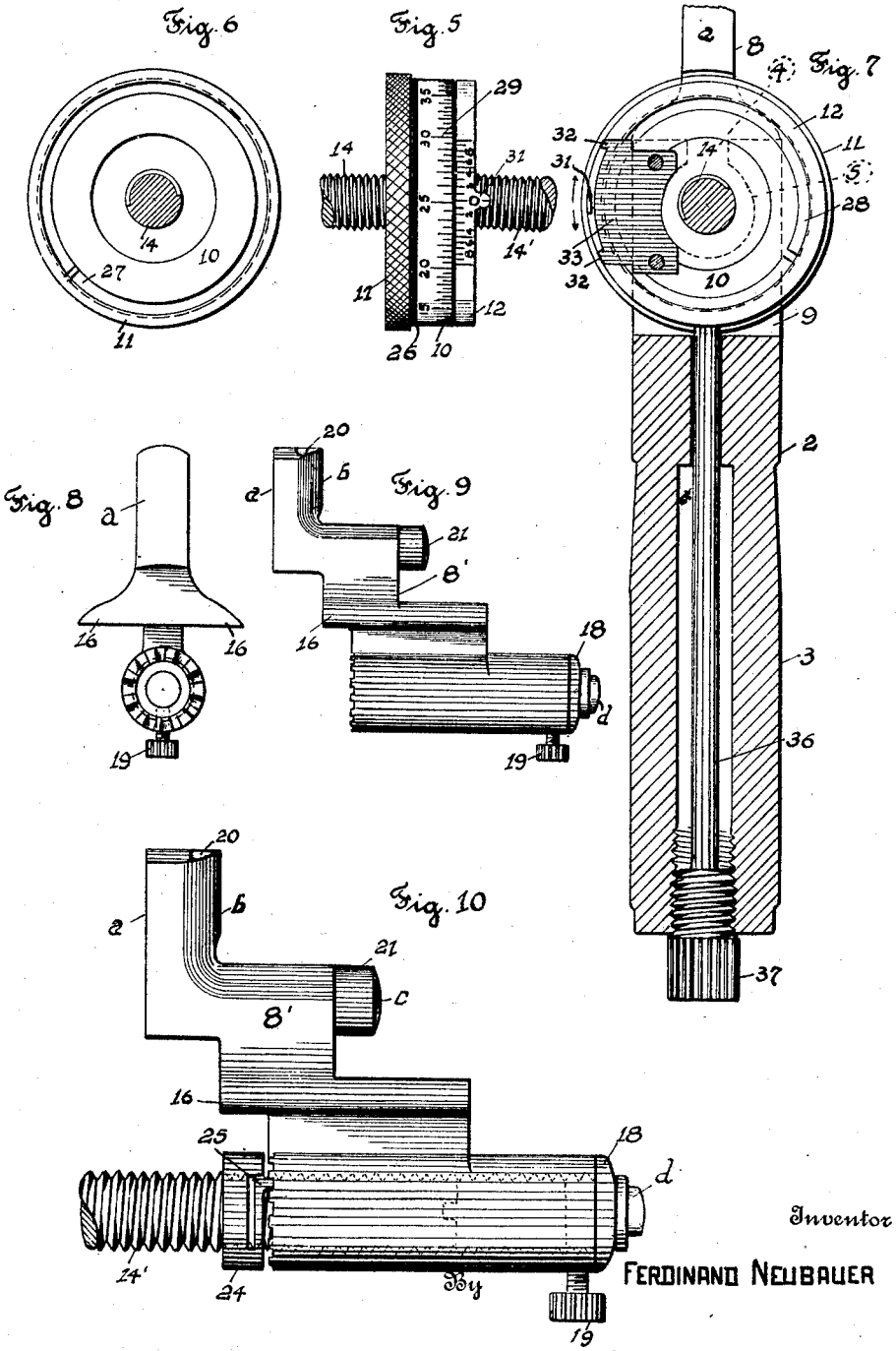
Inventor
FERDINAND NEUBAUER
By Fisher, Moser & Moore
Attorneys Patented Apr. 24, 1928.

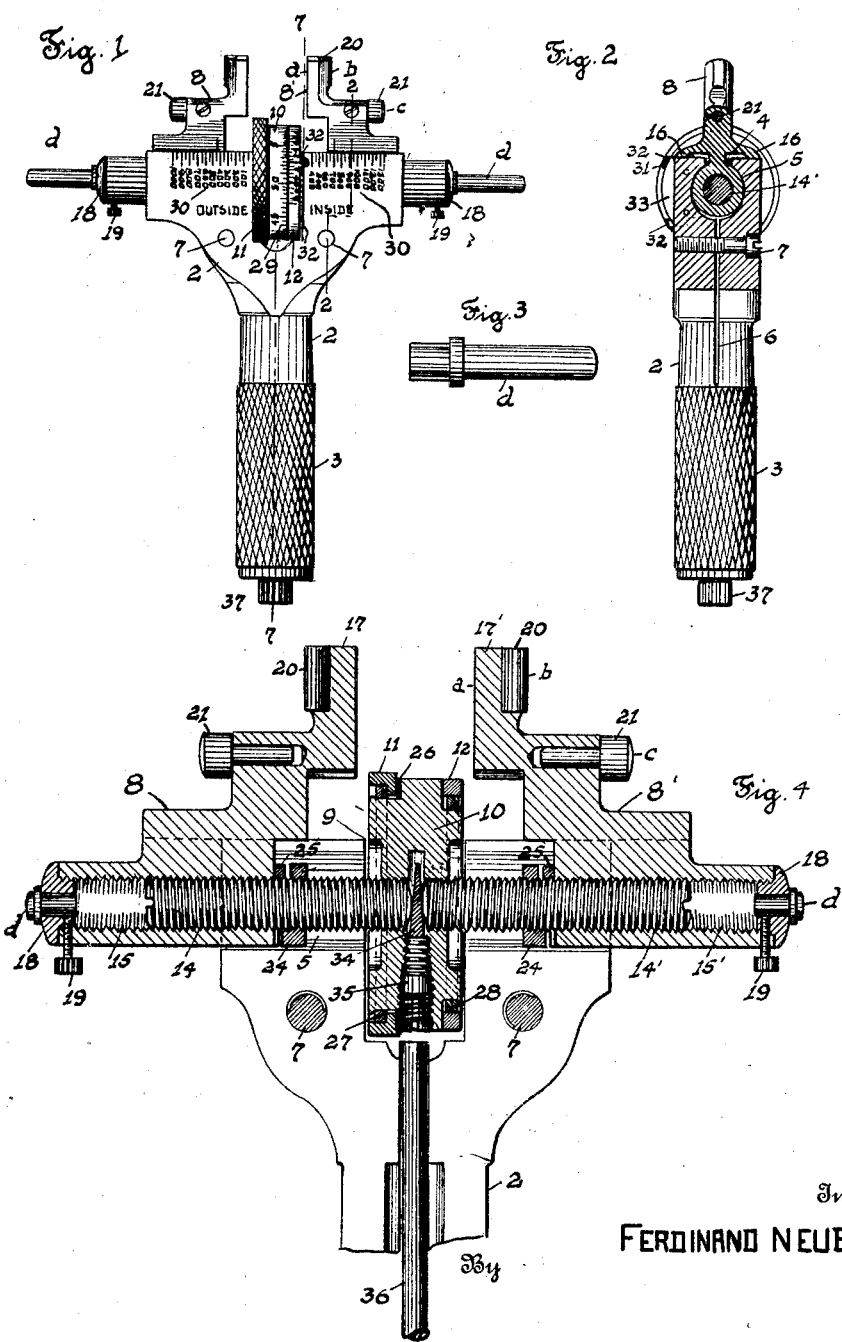

1,667,562

UNITED STATES PATENT OFFICE.

FERDINAND NEUBAUER, OF BROOKLYN, OHIO.

MICROMETER.

Application filed December 21, 1926. Serial No. 156,199.

My invention relates to an improvement in micrometers, and my object in general is to provide a compact and simple measuring instrument having certain new and novel features of construction adapted to promote ease of manipulation, accuracy of results, and to give the instrument a wide range of application, all substantially as herein shown and described and more particularly pointed out in the claims.

In the accompanying drawings Fig. 1 is a side elevation of the micrometer in a partly open condition. Fig. 2 is a sectional view on line 2—2 of Fig. 1. Fig. 3 is a detail view of a supplemental measuring part which is adapted to be detachably connected to one of the movable jaw members. Fig. 4 is a sectional view of the operating parts, on an enlarged or magnified scale. Fig. 5 is a side view, enlarged, of the central operating and measuring collar for the feed screw. Fig. 6 is a side view of said collar and a section of the screw. Fig. 7 is a sectional view centrally through the handle portion of the instrument on line 7—7 of Fig. 1. Figs. 8 and 9, are end and side views, respectively, of one of the sliding jaw members. Fig. 10 is a side elevation of the jaw member and its spring locking ring screwed together upon the feed screw.

The invention comprises a forked body 2 having a cylindrical handle 3 depending therefrom. The opposite sides of this forked part of body 2 are flat, and the top is flat also and formed with a longitudinal slot 4 which opens into a round or oval bore 5 extending lengthwise of body 2. Moreover the lower part of body 2 is divided into two parts by a narrow slit 6 extending downwardly from the bottom of bore 5 into the upper end of handle 3, and the divided parts may be spread apart or drawn together slightly by screws 7 to effect adjustments for wear and to promote alignment and smoothness of operation of two slidable measuring members 8—8'. The transverse opening 9 centrally within body 2 contains a solid rotatable disk or wheel 10 which carries two independently rotatable collars 11 and 12, respectively, and two screw-threaded shafts 14—14' are affixed to the central part of disk or wheel 10 and extend in opposite directions therefrom to engage and operate the slide members 8—8'. Shafts 14—14' are provided with right and left hand screwthreads, respectively, wherewith to slide members 8—8' in opposite directions when the disk or wheel 10 is rotated, it being understood that the cylindrical body parts of said slide members contain correspondingly threaded bores 15—15' adapted to receive said shafts. Each slide 8—8' comprises lateral flanges 16—16 adapted to overlap and engage the flat top of divided body 2, and the circular bore 5 is slightly eccentric to the cylindrical body part of each slide member so that when screws 7 are tightened the said flanges will be drawn downwardly in slight degree to establish a snug fit and smooth sliding contact with the flat top of body 2. Slides 8—8' provide supporting bearings for the screw-threaded shafts or spindles and their common operating disk or wheel 10, which wheel prevents axial shift of said spindles because it is confined within the transverse opening 9 in body 2. Each slide member 8—8' extends upwardly beyond the top of body 2, and this vertical extension is of stepped formation to provide a series of measuring faces $a$, $b$, and $c$, which are spaced predetermined distances apart. Thus the exposed upper part of each slide has the appearance of a stepped jaw, and the higher stepped parts 17—17' are adapted to overlap the disk or wheel and bear against each other in the zero measuring position of slides 8—8'. The opposed faces $a$, of stepped parts 17—17' may be used for outside measuring purposes and faces $b$ and $c$ are for inside measurements. A third inside measurement may be made by using the outer end of the cylindrical body of each slide, or a separate contact element $d$ may be detachably secured to a screw plug 18 in said outer end for that purpose. The measuring faces $b$ and $c$ also form part of separate removable elements or hardened steel pins 20 and 21, respectively, see Fig. 4. These hardened pins may be readily removed and exchanged in case of wear, and pins 21 of different length may be substituted to simplify readings for different measuring ranges. Contact element $d$ may be of any desired length, and is held in place by a set screw 19 to permit either longer or shorter elements to be substituted therefor.

To avoid loose play and to take up the wear on the screw-threads on the slides and screw shafts, I employ a tension nut 24 which is adapted to have rotatable interlocking connection with each slide. Thus, the inner end of the cylindrical body of each slide is serrated radially in respect to the screw shaft, and nut 24 is partly split at one or more places to provide one or more spring tongues 25 having a projecting extremity adapted to interlock with the serrated teeth, see Figs. 4 and 10.

From the foregoing it will be seen that the jaw portions of the two slides may be brought together, or separated various distances, by rotating disk or wheel 10 the requisite number of times. Now assuming the limit of movement toward each other has been reached and the jaws 17—17′ resist further movement, it is obvious that the operator might place considerable stress on the disk to continue the movement and thereby bind the screws or strain the connections. To prevent this from happening, I mount a knurled collar 11 upon disk 10, which collar is of slightly larger diameter than the disk to permit the fingers and thumb of the operator to grip it instead of the disk. This collar occupies a circumferential recess in one edge of the collar where it may be held in frictional contact with a leather washer 26 by means of a split locking and clamping ring 27, see Figs. 4 to 6, thus transmitting the applied power frictionally through the collar to the disk or wheel. Obviously collar 11 may be rotated independently without bind on the screws after the slides have reached the limit of their movement. The opposite corner edge of disk 10 is also recessed to confine a second collar 12 and split friction ring 28 therein. However this second collar 12 serves a different purpose, in fact it serves three distinct purposes. First, disk 10 bears on its circumferences graduations 29 representing subdivisions of the measuring scales 30 on the sides of body 2, whereby the degree of rotation of the disk may be indicated and readings of one-thousandth of an inch may be easily denoted. Secondly, collar 12 bears a zero mark and vernier graduations to further subdivide the readings. Thirdly, the collar 12 bearing the zero mark is adapted to have a limited compensating or resetting movement in respect to disk 10 to make up for lost motion in reversing the direction of movement of the screws and slides, thus promoting absolute accuracy in obtaining readings for both inside and outside measurements. The compensating movement of collar 12 is fixed or determined by a lateral lug 31 on the collar and two stops 32—32 on body 2, or more correctly speaking stops 32 are integral parts of a plate 33 secured to body 2 adjacent disk 10 and collar 12, see Figs. 1, 5, and 7. Another advantage of having a vernier collar rotatably related to fixed stops on the body, is that the measuring jaws may be reversed to release their grip on the work and the instrument may be then removed and inspected without disturbing the setting of the vernier collar in respect to the graduated disk. This may be done because the collar is frictionally engaged with the disk and will move the disk and not change the setting until the lug 31 on the collar strikes a stop 32.

To permit exact setting and adjustment of the sliding jaw members 8—8′ I prefer to use two separate screw shafts 14—14′ and secure them separately within the center of disk 10, as follows: Each screw-threaded shaft has a slotted outer end adapted to be engaged by a screw driver to permit attachment and detachment and also adjustment thereof in respect to a thin wedge-shaped piece 34 which is adapted to be interposed between the inner ends of the screw shafts, see Fig. 4. A set screw 35 extends through the periphery of disk 10 into bearing engagement with wedge 34, and the screw shafts may be clamped tightly in their threaded seats in the disk by means of this set screw and the wedge. Each screw shaft may also be rotated when unlocked to permit longitudinal adjustment thereof and slightly changed settings of the measuring slides 8—8′ relatively to each other.

I also provide means for locking disk 10 against rotative movement after adjusting or setting the slides, which means comprises a screw-threaded rod 36 extending centrally through handle 3 where the inner end of the rod may be clamped against the periphery of disk 10. A knurled head 37 on the outer end of the rod permits convenient operating control of this disk locking member.

What I claim, is:

1. A micrometer, comprising a pair of movable jaw members having stepped contact places for inside and outside measuring purposes, means for shifting said members, and measuring means for the movement of said jaw members, including a zero marking element shiftable in limits in respect to said measuring means and adapted to compensate for lost motion in said parts and promote accurate readings for both inside and outside measurements.

2. A micrometer, comprising a handle, movable measuring members supported by said handle having inside and outside gaging places, and operating means upon said handle for said measuring members, including a zero-marking device shiftable in respect to said operating means to different fixed positions for inside and outside gaging.

3. A micrometer, comprising a handle having a slotted top and an elongated opening in said top, screw shafts within said opening, elongated measuring members longitudinally slidable supported on the top of said handle, extensions on said measuring member extending into the slotted part of said top portion in screw engagement with said screw shafts in said opening, and means for rotating said shafts.

4. A micrometer, comprising a handle having a forked top portion, movable measuring members slidably mounted upon said top, reversely-threaded screw shafts having operating connection with said members, and a graduated disk exposed at the middle of said forked top adapted to operate said screw shafts.

5. In a micrometer, movable measuring members, and an operating member for said measuring members including a pair of screw-threaded shafts longitudinally adjustable fixed in said operating member, to permit changes in settings of said measuring members relatively to each other.

6. In a micrometer, measuring members and rotatable devices for shifting the same, including a graduated disk and a collar rotatably mounted upon said disk but frictionally engaged therewith, said collar having an index mark therein associated with the graduations on said disk.

7. In a micrometer, measuring members, an operating screw for said members, a graduated disk connected with said screw, a frictional operating collar for said disk, an indicating member frictionally engaged with said disk and fixed stops for said indicating member to permit limited shifting of said indicating member by said disk.

8. A micrometer, comprising a handle, movable measuring members supported and guided by said handle, a screw confined within said handle having screw engagement with said members, a graduated operating wheel for said screw, a compensating index member frictionally engaged with said disk, and stops on said handle adapted to limit the movement of said index member upon rotatable movements imparted thereto by said disk.

9. A micrometer, comprising a handle having a flat top portion, a longitudinal downwardly extending slit in said top portion having an enlargement to provide a longitudinal opening in said slit, movable jaw members slidably supported upon said flat top portion, said jaw members having cylindrical downwardly extending body parts adjustably held in said longitudinal opening and means for clamping the slitted parts of said handle together for drawing said movable jaw members downwardly upon said flat top portion in case of wear.

In testimony whereof I affix my signature.

FERDINAND NEUBAUER.